May 27, 1969 W. N. DUNLAP, JR., ETAL 3,446,657

COATING METHOD

Filed June 18, 1964

INVENTORS
WILLIAM N. DUNLAP JR.
HERMAN KORETZKY
HARRY D. Mc CABE

BY George O. Saile
ATTORNEY

United States Patent Office 3,446,657

Patented May 27, 1969

3,446,657

COATING METHOD

William N. Dunlap, Jr., and Herman Koretzky, Poughkeepsie, and Harry D. McCabe, Wappingers Falls, N.Y., assignors to International Business Machines Corporation, New York, N.Y., a corporation of New York Filed June 18, 1964, Ser. No. 376,106
Int. Cl. G11b *5/62;* C23c *3/02*
U.S. Cl. 117—160 5 Claims

ABSTRACT OF THE DISCLOSURE

Magnetic cobalt films having controlled coercivity are provided by utilizing selected concentrations of malonate ions in electroless cobalt plating baths of the cobalt cation-hypophosphite anion type. By selecting the concentration of malonate ions, magnetic cobalt films having controlled coercivity within the range of about 350 to 900 oersteds are obtained.

Figure 1:
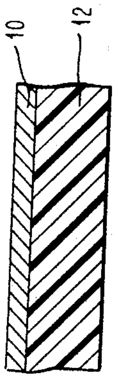

Magnetic recording devices in the form of a thin film of magnetic material on a substrate such as a tape, drum, disc, loop surface and the like are extensively used in computer and data processing systems. The most extensively used magnetic coating is a finely divided ferric oxide dispersion in a thermoplastic binder composition. Electrodeposited ferromagnetic films such as cobalt-nickel alloy films have also found use where high-density data storage is required. There have been suggestions that an electroless plated cobalt or a cobalt-nickel alloy film could be used as the magnetic layer for magnetic recording devices. Although this cobalt electroless or cobalt-nickel alloy type of magnetic surface would apparently have great advantages in ease of producing the magnetic coating, this type of magnetic coating has not found commercial success.

The electroless deposition of ferromagnetic metallic layers is known to the art. This type of metallic deposition does not depend on the presence of a couple between galvanically dissimilar metals. Instead, the mechanism of the reactions is based on a chemical added to the plating solution which acts as a reducing agent for the metal being plated. In electroless plating, the metal ion in solution is reduced to the corresponding metal by gaining the required number of electrons. The source of these electrons is the oxidation of a reducing agent in the plating solution which generally in the art is the hypophosphite ion. The plating process has the obvious advantage over electroplating in that the substrate on which the metal is deposited need not be a conductive one. A thin, ferromagnetic film, such as cobalt, can then be applied, for example, to a thermoplastic base material. Where the thermoplastic base is an elongated tape, the coating upon the base results in an elongated magnetic tape which has an extremely low inertia and is flexible enough to travel at high speeds around bearing members such as capstans or the like.

A ferromagnetic metal coating is superior to the widely used magnetic ferric oxide type of magnetic coating. The magnetic oxide is dispersed in a thermoplastic binder composition which makes up at least 50 percent of the volume of the coating. It is therefore necessary that a considerable thickness of coating be built up on the substrate in order to obtain a desired level of output. Recording mediums of this magnetic oxide type also are found to have a rough or abrasive surface and do not provide the optimum conformity to the magnetic recording head. The bit density storage capacity of magnetic oxide mediums is also quite low in comparison to the ferromagnetic metal coated recording mediums.

It is further known in the prior art to use an alkaline electroless plating solution for plating films of cobalt. In such solutions, complexing or chelating agents are commonly used to prevent the precipitation of metal hydroxide from the solution, and to control the rate of plating and the appearance of the deposit. The complexing agents used in the past for electrolessly depositing cobalt were tartaric or citric acids. These prior art cobalt plating solutions were used to deposit cobalt where the magnetic properties of the cobalt thin film were either not important or those in the art had no better complexing agent to use. It has been found that the tartrate ion in the cobalt electroless plating bath produces deposits exhibiting coercivity higher than desired for optimum recording characteristics in magnetic record members. The use of citrate, on the other hand, as the complexing agent in a cobalt electroless plating solution produces thin films having magnetic properties, such as coercivity, which are not conveniently controllable. The coercivities may vary from 600 to 1200 oersteds. The operating concentration of the citrate ion in solution must then be controlled within very narrow limits to produce a magnetic film of one coercivity along its entire length. Further, the precise coercivity desired cannot be obtained in this type of plating bath.

The production of magnetic recording films of a particular desired coercivity is critically important for data processing uses. This is so because the utilization of these magnetic films of cobalt or a cobalt-nickel alloy as magnetic recording surface requires that they be fabricated so as to posses a predetermined coercivity and thereby function predictably as memory films in such magnetic devices as tapes, loops, drums, discs and the like. The desired coercivity for a particular application may vary substantially from that of other applications. Such a coercivity may be as low as 0.5 oersteds in one case and as high as 1200 oersteds in another. It is therefore seen that there is a great need for a technique for depositing a magnetic film having a controlled coercivity. Such a technique would allow the production of an optimum coercivity magnetic film for the particular application intended.

It is thus an object of this invention to provide a chemical reduction process for depositing a magnetic cobalt thin film having a controlled coercivity.

It is a further object of this invention to provide an aqueous electroless cobalt bath which uses a complexing agent that allows the choice of the coercivity magnitude of the resulting cobalt deposit by changing the concentration of the complexing agent in the electroless bath.

It is a still further object of this invention to provide a chemical reduction process for depositing a magnetic cobalt thin film having optimum coercivities and without a rapid deterioration of the plating bath by use of a malonate complexing agent.

It is another object of this invention to provide a magnetic record member having an electroless cobalt deposited thin film magnetic surface of optimum magnetic properties which has been deposited from a cobalt electroless bath which contains a malonate complexing agent.

These and other objects are accomplished in accordance with the broad aspects of the present invention by providing a chemical reduction process which utilizes an electroless cobalt bath containing a malonate ion complexing agent within a critical concentration range. It has been discovered that malonate ion in an electroless cobalt plating bath over a critical concentration range will allow a wide range of coercivities to be obtained in the deposited cobalt film. The other components of the aqueous electroless bath are a cobalt salt, an alkaline hypophosphite, an ammonium salt and ammonium hydroxide in sufficient quantities to maintain the solution pH between 8 and 11.

The foregoing and other objects, features and advantages of the present invention will be apparent from the following more particular description of the preferred embodiments of the invention as illustrated in the accompanying drawings.

Figure 2:
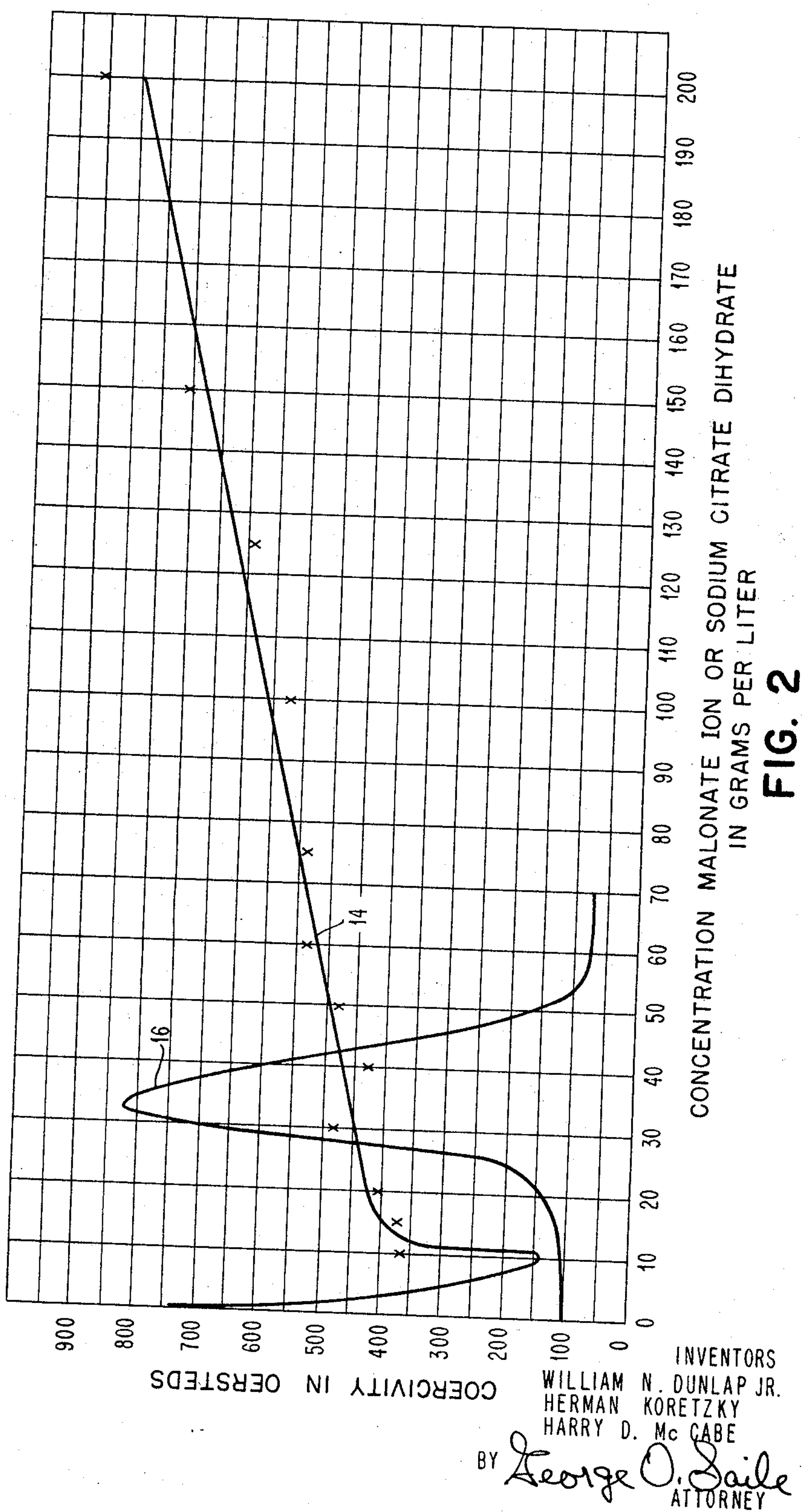

In the drawings:

FIGURE 1 is a cross sectional illustration of the magnetic record member of the present invention; and FIGURE 2 is a graphical illustration showing the variation of coercivity in an electroless cobalt deposit over the critical range of malonate ion concentration and for the prior art citrate complexing agent.

The advantage of the electroless cobalt plating is that it may be applied to any substrate, including nonconductors such as glass, ceramics, plastics, etc. The FIGURE 1 shows the thin cobalt magnetic coating 10 of from about 250 to 5000 Angstrom units in thickness supported on a plastic substrate 12. This is the ideal structure for high density magnetic recording tape where the magnetic cobalt layer has a coercivity of constant value and has a hysteresis loop which is substantially square, that is the ratio of remanent magnetization to saturation magnetization $M_r/M_s$ is approximately equal to one. For other magnetic memory devices such as a magnetic drum or disc, a metallic substrate may be substituted for the plastic substrate.

Prior to the electroless deposition of cobalt onto the substrate, the substrate must first be prepared by cleaning, making its surface hydrophilic, and sensitizing its surface. The cleaning step involves conventional mechanical scrubbing and chemical cleaning techniques. Nonmetallics, such as plastics, ceramics and glass, are generally hydrophobic, that is, surfaces which show a water-break, so that it is necessary with these materials to make their surface to be electrolessly plated hydrophilic, that is, showing no water-break. A surface to be rendered hydrophilic can be first mechanically roughened as with an abrasive material or the like. A chemical etching process is then preferably used to further condition the surface to make mechanical keying points over the surface which subsequently allows good bonding between the electroless plating and the nonconductor. In the case of a polyethylene terephthalate web, for example, a conditioning treatment is necessary. The preferred treatment is described in U.S. Patents 3,142,581 and 3,142,582 both of which are assigned to the assignee of the present invention.

The surface must be sensitized following the cleaning and conditioning steps, whether the surface to be electrolessly deposited on is a noncatalytic metallic one or a nonconductor surface. The preferred sensitizing technique is successive dips in stannous chloride solution, and a final water rinse. In the sensitizing process the stannous ion is absorbed onto the surface of the substrate during the stannous chloride dip. The absorbed stannous ion is readily oxidized. Therefore, when the substrate having the stannous ion absorbed thereon is dipped into the solution containing the noble metal palladium, the metal is reduced and is absorbed onto the surface of the substrate. The palladium on the substrate acts as a catalytic surface for the subsequent electroless plating.

The preferred and operative ranges of composition of the aqueous electroless cobalt plating bath are given in grams per liter in the following Table I.

TABLE I

| | Operative | Preferred |
|---|---|---|
| Cobaltous ion ($Co^{++}$) | 3.75 to 15.0 | 6.5 to 8.0. |
| Hypophosphite ion ($H_2PO_2^-$) | 3 to 24.5 | 6.1 to 18.3. |
| Malonate ion ($C_3H_2O_4^=$) | 15 to 200 | 15 to 200. |
| Ammonium ion ($NH_4^+$) | 1 to 100 | 8 to 27. |

The cobalt ion is provided by use of any suitable soluble cobalt salt such as cobalt chloride. cobalt sulfate, cobalt acetate and cobalt sulfamate. The hypophosphite ion is brought into solution by use of an alkaline hypophosphite. The ammonium ion is brought into solution from a soluble buffering salt, such as ammonium sulfate, and ammonium hydroxide. Malonic acid or an alkaline malonate is used to provide the malonate ion in solution.

The pH of the solution is maintained within the alkaline range of about 8 to 11. This alkalinity is obtained by the addition of hydroxides, such as ammonium hydroxide, and ammonium salts such as ammonium sulfate or chloride. The preferred alkali range is a pH of 8.8 to 10.0. This preferred range can be obtained with constant addition to the bath of ammonium hydroxide.

The FIGURE 2 shows how as given by curve 14, by varying the concentration of the malonate ion in the aqueous electroless cobalt solution, a desired coercivity in the deposited cobalt film may be obtained within a range of approximately 350 to 950 oersteds for a cobalt film thickness ($M_r$) of approximately $6\times10^{-3}$ emu. The discovery of this relationship in the critical range of malonate concentration is very important since now by merely varying the concentration of the malonate ion in the electroless bath it is possible to obtain a selected coercivity of electroless cobalt coating for the desired purpose of the cobalt film.

The variation of sodium citrate dihydrate concentration with coercivity for a constant film thickness is given for comparison at curve 16, in FIGURE 2. The citrate complexing agent is widely used in electroless plating baths. However, the unexpected controllability of the magnetic properties of cobalt electrolessly deposited films where malonate ion was used rather than citrate ion is clearly shown by reference to the FIGURE 2. High coercivities can be obtained only in a limited complexing agent concentration range when the citrate ion is used. Intermediate coercivities are practically unattainable using citrate ion complexing agent because of the characteristic rapid change in coercivity with concentration change. The malonate ion alone when used as a complexing agent gives a magnetic cobalt film deposit which changes in coercivity with concentration at a gradually linear rate over a wide range of from about 15 to 200 grams per liter.

The following examples are included merely to aid in the understanding of the invention, and variations may be made by one skilled in the art without departing from the spirit of the invention.

Example 1

A polyethylene terephthalate web was first conditioned according to the treatment of U.S. Patent 3,142,582, referred to above, and then sensitized by successive exposure to a stannous chloride solution and a palladium solution with water rinsing after each exposure. The stannous chloride solution included 30 grams per liter of stannous chloride, 10 milliliters per liter of hydrochloric acid and the balance water. The palladium chloride solution included 0.1 gram per liter palladium chloride, 10 milliliters per liter hydrochloric acid and the balance water. The sensitized web, at this time had palladium on its surface.

The presensitized web was placed in an electroless cobalt plating solution. The electroless bath had the following composition and operating conditions:

| | |
|---|---|
| Cobalt sulfate ($CoSO_4\cdot7H_2O$) --grams/liter-- | 34.5 |
| Sodium hypophosphite ($NaH_2PO_2\cdot H_2O$) --do-- | 20 |
| Ammonium sulfate [$(NH_4)_2SO_4$] --do-- | 66 |
| Malonic acid [$CH_2(COOH)_2$] --do-- | 10 |
| pH (adjusted with ammonium hydroxide $NH_4OH$) | 8.9±0.1 |
| Temperature --° F.-- | 160–170 |

The web was allowed to remain in the electroless plating bath until the thickness ($M_r$) of the cobalt deposit was approximately $6\times10^{-3}$ emu. No agitation was used during the deposition. A bright and continuous appearing metallic cobalt deposit was observed on the web. The coercivity and the remanent magnetization of the film were measured by standard techniques and are listed in the Table II.

TABLE II

| Example | Malonate Ion Concentration in Grams/Liter | Coercivity $H_c$ in Oersteds | Remanent Magnetization, $M_r$, in emu | Time (Seconds) |
|---|---|---|---|---|
| 1 | 10 | 368 | $5.76\times10^{-3}$ | 29 |
| 2 | 15 | 370 | $6.54\times10^{-3}$ | 28 |
| 3 | 20 | 409 | $6.30\times10^{-3}$ | 46 |
| 4 | 30 | 482 | $5.82\times10^{-3}$ | 50 |
| 5 | 40 | 430 | $6.67\times10^{-3}$ | 56 |
| 6 | 50 | 484 | $6.06\times10^{-3}$ | 44 |
| 7 | 60 | 539 | $5.76\times10^{-3}$ | 47 |
| 8 | 75 | 546 | $6.18\times10^{-3}$ | 50 |
| 9 | 100 | 574 | $6.54\times10^{-3}$ | 56 |
| 10 | 125 | 639 | $6.42\times10^{-3}$ | 61 |
| 11 | 150 | 755 | $5.82\times10^{-3}$ | 66 |
| 12 | 200 | 911 | $5.64\times10^{-3}$ | 70 |

Examples 2 through 12

The conditioning and sensitizing procedure of Example 1 was used to condition and sensitize a polyethylene terephthalate web for each example. The web was placed in the electroless cobalt plating bath. The electroless cobalt plating bath was identical to that of the Example 1 bath. except the concentration of the malonate ion was varied as given in the Table II. Each web was allowed to remain in its respective plating bath until its thickness ($M_r$) was approximately $6\times10^{-3}$ emu. No agitation was used during the deposition in any of the examples. A bright and continuous metallic cobalt deposit was observed on each of the webs. The coercivity and remanent magnetization $M_r$ were obtained for each of the examples by standard techniques and are listed in the Table II.

The magnetic coercivity values of the examples were plotted against the concentration of the malonate ion in the electroless cobalt plating solution as in FIGURE 2. It is therefore seen that by merely picking the concentration of the malonate complexing agent as indicated by the FIGURE 2, a cobalt film may be electrolessly deposited with a desired coercivity. The plating rate is adequate within the operative range given in the Table I with the resulting thicknesses of electroless cobalt deposit of adequate thickness for magnetic recording purposes.

While the invention has been particularly shown and described with reference to the preferred embodiments thereof, it will be understood by those skilled in the art that the foregoing and other advantages in form and detail may be made therein without departing from the spirit and scope of the invention.

What is claimed is:

1. A chemical reduction process for plating magnetic cobalt film having selected coercivity onto a catalytic substrate, said process comprising:

subjecting said substrate to a plating bath of a cobalt salt which produces cobalt ions in solution, an alkaline hypophosphite which produces hypophosphite ions in solution, and a material which porduces malonate ions in solution selected from the group consisting of malonic acid and an alkaline malonate, wherein said malonate ion concentration is between about 15 and 200 grams per liter, said malonate ion concentration being selected to directly and functionally control the coercivity of the plated cobalt film in the range of about 350 to 900 oersteds.

2. The process of claim 1 by which the magnetic cobalt film produced has a coercivity in the range of about 350 and 600 oersteds wherein the total available concentration of malonate ions in solution is between about 15 and 100 grams per liter.

3. The process of claim 1 by which the magnetic cobalt film produced has a coercivity in the range of about 600 and 900 oersteds wherein the total available concentration of malonate ions in solution is between about 100 and 200 grams per liter.

4. The process of claim 1, wherein the total available concentration of cobalt ions is between about 3.75 and 15 grams per liter, the total available concentration of hypophosphite ions is between about 3 and 24.5 grams per liter, and wherein the pH of the solution is maintained between about 8 and 11.

5. The process of claim 1 wherein the total available concentration of cobalt ions is between about 6.5 and 8.0 grams per liter, the total available concentration of hypophosphite ions is between about 6.1 and 18.3 grams per liter, and the pH of the solution is maintained between about 8.8 and 10.0.

References Cited

UNITED STATES PATENTS 2,532,284 12/1950 Brenner et al.
2,871,142 1/1959 Hays.
2,935,424 5/1960 Gutzeit et al.
2,942,990 6/1960 Sullivan ---------- 106—1
3,116,159 12/1963 Fisher et al. ---------- 117—47
3,138,479 6/1964 Foley ---------- 106—1
3,148,072 9/1964 West et al. ---------- 106—1
3,238,061 10/1965 Tsu et al. ---------- 117—47
3,212,918 3/1965 Koretsky et al. ---------- 117—47
3,245,826 4/1966 Luce et al. ---------- 117—47
3,269,854 8/1966 Hei ---------- 117—71

OTHER REFERENCES

Gutzeit, "An Outline of the Chemistry Involved in the Process of Catalytic Nickel Deposition From Aqueous Solution," Part IV, Plating, January 190, pp. 63–70.

JULUIS FROME, *Primary Examiner.*

L. HAYES, *Assistant Examiner.*

U.S. Cl. X.R.

106—1; 117—47, 130, 235